Oct. 4, 1932.  F. Y. PEARNE ET AL  1,881,061
HYDRAULIC CLAY MOLDING MACHINE
Filed Feb. 6, 1931  4 Sheets-Sheet 3

INVENTORS!
FRANK Y. PEARNE
WILLIAM McCLINTOCK
By Russell Lahraham
ATTORNEY.

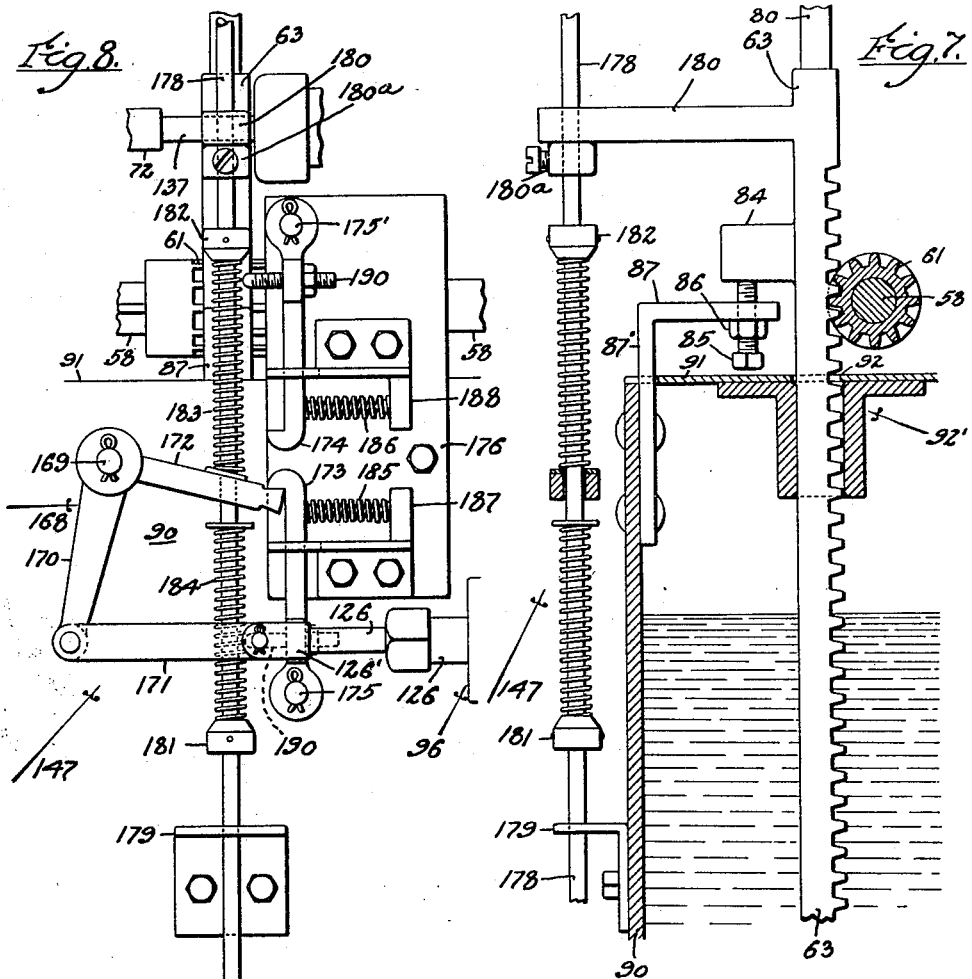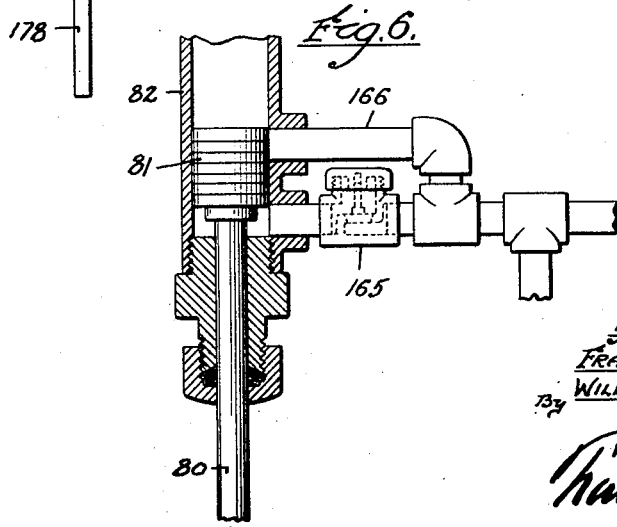

Patented Oct. 4, 1932

1,881,061

UNITED STATES PATENT OFFICE

FRANK Y. PEARNE, OF ALHAMBRA, AND WILLIAM McCLINTOCK, OF LOS ANGELES, CALIFORNIA, ASSIGNORS OF ONE-THIRD TO FRANK R. GALBREATH, OF LOS ANGELES, CALIFORNIA

HYDRAULIC CLAY MOLDING MACHINE

Application filed February 6, 1931. Serial No. 513,879.

This machine relates broadly to the art of molding clay, and is more particularly related to machines for making flower pots, or the like, and has as its primary object the production of such a machine which is entirely automatic in its operation.

The usual practice followed in molding articles of the class described entails the use of a suitably shaped mold which is adapted to receive a correspondingly shaped mandrel or core member. A properly proportioned ball of clay is placed in the mold, and the core member is forced into engagement with the clay by suitable pressure means. It is preferable that the core member be rotated, and remain in the mold over a brief period of time after it has reached its lowermost position. After the core member is removed, the formed article is extracted for burning, and a fresh portion of clay is placed in the mold.

In machines now in use for molding articles of the general character described above, the molding core is continuously reciprocated in a stationary die. The clay to be molded is dropped into the mold by hand and the molded article is manually removed. These machines are a source of frequent injury to the operators who become careless in extracting the articles from the mold and sometimes, especially in the event the articles are difficult to disengage, permit their hands to be caught between the die and the mold. It is, therefore, an object of this invention to produce a machine of the class described, which is safe to operate and in which the possibility of injury to the operator is eliminated.

The main object of the present invention is to produce a device of the general character described above which embodies a plurality of molds, each associated with an extracting member, and means for operating the extracting member, such means being correlated with a reciprocating core member so that a formed article is extracted from one of the molds while another article is being formed in one of the other molds.

The device contemplated by this invention may be operated either mechanically or hydraulically. In our companion application, Serial No. 513,880, which is being filed under even date with this application, we disclose a mechanically operated machine, and the present application relates to a hydraulically operated machine.

The general construction of the device contemplated by this invention embodies a frame which supports a rotary table carrying a plurality of molds. A reciprocating core member is mounted on the frame above the table, and is adapted for intermittent movement into the respective molds. Hydraulic means are provided for reciprocating the core member and rotating the table, and these means are correlated so that the table is rotated only at such times as the core member is completely removed from the molds.

The device is also provided with a table locking mechanism which is operated in conjunction with the table rotating mechanism and is adapted to positively lock the table against rotation while the core member is being advanced into one of the molds. Each of the molds contains an extracting member adapted to remove the formed article therefrom, and such extracting members are intermittently operated by means associated with the core reciprocating means. The extracting operation takes place in one of the molds while the core member is advancing into another of the molds.

Means are also provided for continuously rotating the core during its reciprocation, and it is a noteworthy feature of this invention that all of the mechanism described above is operated from a single source of power.

Another noteworthy feature of this invention resides in the novel valve structure which is provided for the purpose of controlling the flow of the pressure fluid.

We consider it a further object of this invention to provide the core member with a counterweight which reduces the driving power necessary to operate the machine, thereby increasing its efficiency, and another feature of note in the device contemplated by this invention which adds to its efficiency resides in the arrangement of the counterweight, so that its movement is effective to actuate the extracting member.

The details in the construction of the preferred form of this invention, together with other objects attending its production, will be best understood from the description of the drawings, which are for illustrative purposes only, and in which Fig. 1 is an elevational view showing a preferred form of the machine contemplated by this invention;

Fig. 3 is a sectional elevation taken in a plane represented by the line 3—3 in Fig. 2;

Figs. 4 and 5 are enlarged elevational views with parts broken away, showing details in the construction and operation of the valve mechanism which controls the flow of pressure fluid;

Fig. 6 is a partial sectional elevation showing details in the construction of the base of the hydraulic cylinder which governs the rotation of the table;

Fig. 7 is a partial sectional elevation taken in a plane represented by the line 7—7 in Fig. 2; and Fig. 8 is a partial elevational view showing a preferred form of latch mechanism for controlling the operation of a pilot valve.

Figure 1:
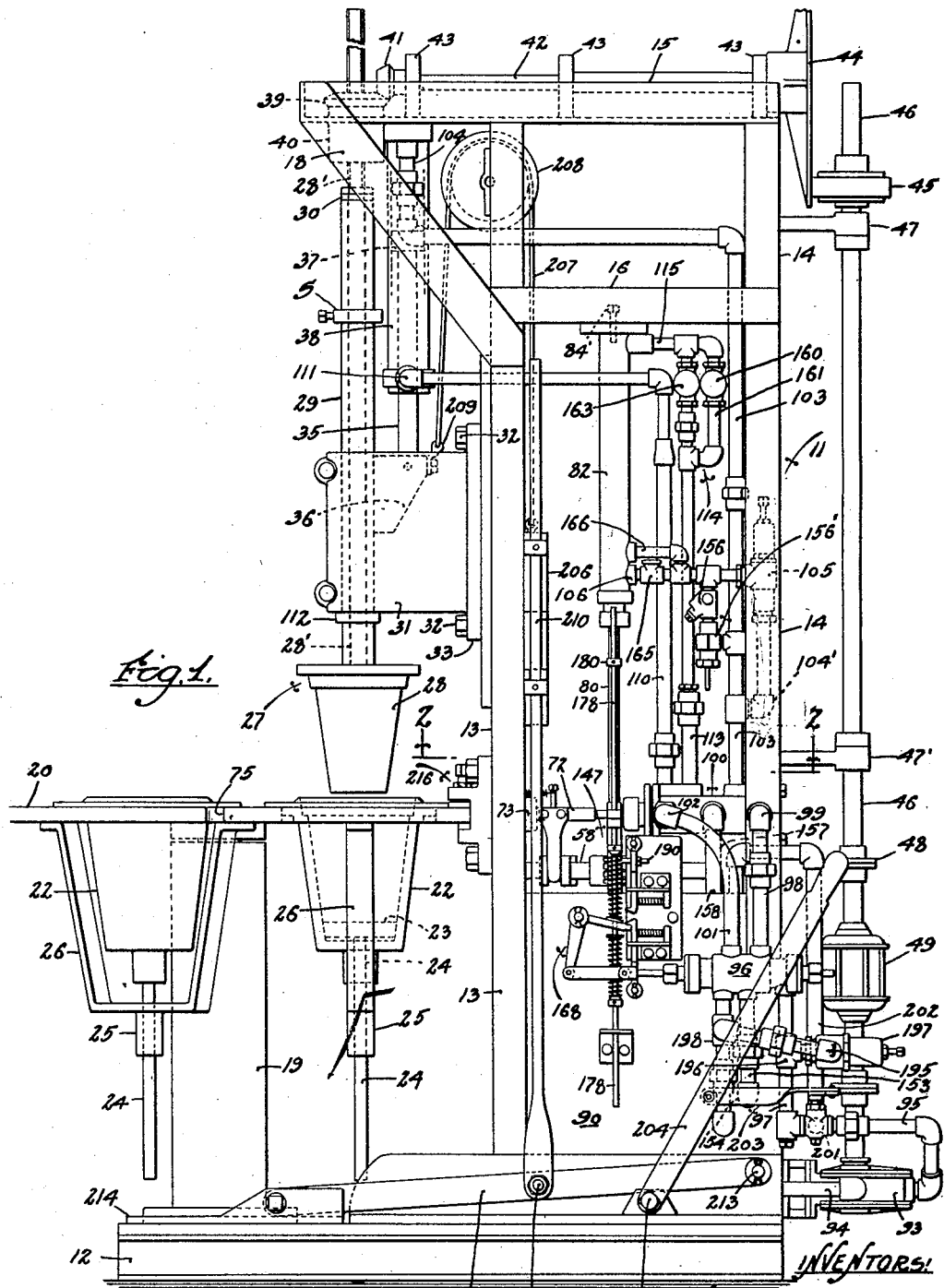
Figure 2:
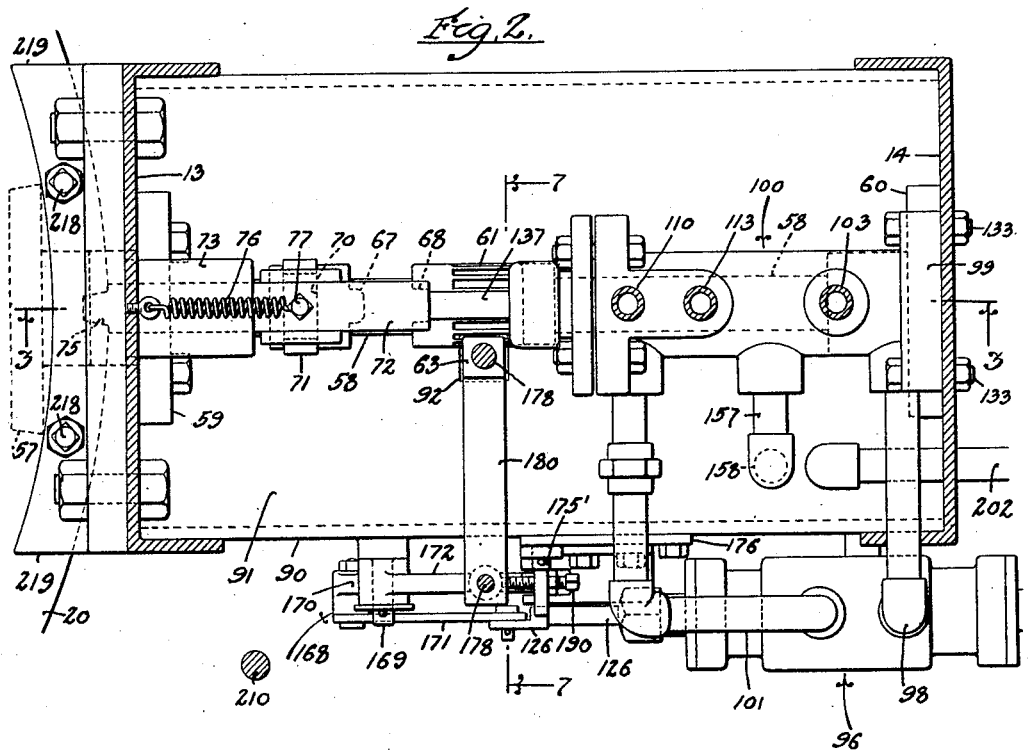
Fig. 2 is a plan section taken in a plane represented by the line 2—2 in Fig. 1.

More particularly describing the invention as herein illustrated, reference numeral 11 indicates a frame member, consisting of a base member 12, standards 13 and 14 and a top plate 15. The upper end portions of the standards 13 and 14 are secured in spaced relation with each other by means of brace members 16, and it will be noted from Fig. 1 that the top plate extends a substantial distance beyond the inner standard 13, and has its end portion supported by an angular brace, or a set of such braces, indicated by reference numeral 18.

Reference numeral 19 indicates a pedestal which is mounted upon the base member 12 and carries a rotary table, or what will be hereinafter referred to as a rotary mold supporting member 20, upon its upper end. The mold supporting table is provided with a plurality of spaced apertures 21 which carry molds 22. Each of the molds 22 is provided with an extracting member which comprises a plate 23 that rests upon the bottom of the mold and is provided with an actuating rod 24 which extends downwardly through the bottom of the mold to a distance below a guide sleeve 25, such sleeve being carried by a bracket 26 which is secured to the bottom of the table.

It will be understood that any preferred number of molds may be placed upon the rotary table, depending upon its size, but since there are only three operations involved in the forming of the article with this machine, we consider it preferable that we use only three molds which are spaced apart at equal angular and radial distances upon the table.

Reference numeral 27 indicates what will hereinafter be referred to as a "core member". The core member 27 comprises a core 28 which is shaped to conform with the internal shape of the article to be formed, and which is shown as being mounted upon the lower end of a rotating spindle 28′, the latter member being contained within a reciprocating sleeve 29 and held against longitudinal movement therein by means of a collar 30. The reciprocating sleeve 29 is supported by a housing 31 which is adjustably mounted upon the front standard 13 by means of bolts 32 extending through the flanges 33 formed on the housing and suitably positioned slots which are provided in the face of the standard. The core member 27 is adapted to receive reciprocation from a piston rod 35 which has its lower end secured to a block 36 mounted on a sleeve 29, and has its upper end attached to a piston 37 which is contained within a hydraulic cylinder 38. The hydraulic cylinder 38 is shown as being secured to the top plate 15 of the frame member. The core 28 is continuously rotated through the medium of the spindle 28′, the upper end portion of which is provided with a flattened or squared section which extends through a correspondingly shaped aperture in a mitre gear 39. The mitre gear 39 is shown as being positioned above the bearing block 40 which is formed in the top plate 15, and forms a support for the spindle 28′.

Reference numeral 41 indicates a drive pinion which engages the mitre gear 39, and is shown as being mounted upon the end of a drive shaft 42, such shaft being supported by bearings 43 mounted on the top plate 15, and being provided on its outer end with a friction disc 44 which is adapted to be driven by friction wheel 45 on a main drive shaft 46. The main drive shaft 46 is supported by bearings 47 and 47′ and has its lower end portion connected through a flexible coupling 48 with the shaft of a vertical motor 49.

It will be noted from Fig. 3 that the under surface of table 20 is provided with a gear 55 which is shown as being in the form of a ring plate secured to the bottom of the table with screws 56. This gear is in mesh with a pinion 57, which is mounted upon the inner end of a table rotating shaft 58. The shaft 58 is shown as being supported by bearings 59 and 60, provided in oppositely disposed relationship upon the standards 13 and 14 respectively, and rotation is imparted to the shaft in one direction only through the medium of a gear 61 which is rotatably mounted upon the shaft, and is held against sliding movement thereon by means of a collar 62.

The gear 61 receives rotation from a rack 63, the operation of which will be hereinafter more fully described. The rotation of the gear is transmitted to the shaft by a spline clutch 64, which is shown as comprising a collar 65 slidably mounted on the shaft 58, and held against rotation thereon by means of a key 66. The collar 64 carries bosses or projections 67 which are adapted to be received in correspondingly shaped recesses 68 formed in the face of the gear 61. The collar 64 is also provided with an annular groove or channel 70 adapted to receive a fork or a finger 71, the upper end of which is secured to a clutch operating bar 72.

The operation of the clutch operating bar and the engagement and disengagement of the collar 64 with the gear 61 will be more fully described later in the specification. Suffice it to say at this time that the means for actuating the rack 63 and the bar 72 are correlated so that the clutch is engaged during the movement of the rack in one direction only.

It is a noteworthy feature of the invention, which should be pointed out at this time, that the clutch control bar 72 is directly associated with, or, in this form of our invention, comprises means for intermittently locking the table against rotation. It will be noted that the bar 72 is slidably mounted in a bearing member 73 which is secured to the inner standard 13 in a position such that the bar 72 rests in substantially the same plane as table 20. The table 20 is provided with a plurality of notches 75 which are so situated with respect to the molds 22 as to hold the table with one of the molds beneath the core member when the end of the bar 72 is in one of the notches. A tension spring 76 is interposed between an upright pin 77 on the bar 72 and a hook 78 on the standard 13 for the purpose of holding the bar 72 in position until the piston 37 reaches the upper end of its stroke and the resultant increase in pressure on the hydraulic fluid is effective to move the bar against the action of the spring as will be hereinafter described.

Means for operating the rack 63 consists of a plunger rod 80 which extends upwardly from the rack and has its upper end secured to a table rotating plunger 81, (Fig. 6), contained within a secondary hydraulic cylinder 82. The cylinder 82 is shown as being secured to the transverse brace member 16 and, as inferred above, the means for delivering hydraulic fluid to opposite sides of the table racking piston 81 and the core reciprocating piston 37 are correlated so as to make the rotation of the table possible only at such times as the core 28 is positioned above the table in the manner shown in Fig. 1.

The downward movement of the rack 63 is limited by means of a stop which is best shown in Fig. 7 as comprising a block 84 mounted on the rear surface of the rack 63 and an adjustable screw 85 which passes through a suitably threaded aperture in an extending arm 87 on a bracket 87'. The bracket 87' may be mounted upon a part of the frame structure or it may be mounted upon one side of a reservoir or tank which contains the hydraulic fluid, and which will be hereinafter designated by a reference numeral.

The upward movement of the rack 63 is limited by a stop screw 84' which extends into the head of cylinder 82.

The hydraulic system and the means for controlling the flow of hydraulic fluid into the cylinders 38 and 82 consists in a general way of a tank or reservoir 90 which is shown as being mounted upon the bottom plate 12 between the bottom portions of the standards 13 and 14. This tank may be provided with a cover member 91 which is provided with an aperture 92 and guide indicated at 92', adapted to receive and guide the movement of the rack 63. The pressure fluid, which may be water, or oil, or any other suitable liquid, contained within the tank 90, is adapted to be delivered under pressure into the cylinders referred to above by means of a continuously operating pump 93. The pump 93 has an inlet pipe 94 coming from the bottom of the tank 90, and an outlet pipe 95 through which the pressure fluid is delivered into a pilot valve 96 through a pilot valve inlet pipe 97.

The pilot valve 96 has a return and delivery outlet 98 leading to one side 99 of a control valve 100 and a second delivery and return outlet 101 which leads to the opposite side 102 of the control valve 100. The side 99 of the control valve 100 is provided with an outlet pipe 103 which is adapted to deliver pressure fluid to the upper end 104 of the core reciprocating cylinder 38. The delivery pipe 103 also contains a by-pass connection 104' which is provided with an adjustable check valve 105, through which the hydraulic fluid is delivered into the lower end 106 of the table rotating hydraulic cylinder 82. The check valve 105 is adjusted so that it will not open until an increased pressure has been created in the line 103 due to the core 28 having reached the bottom of its stroke, which is governed by a stop "S" adjustably mounted on the sleeve 29. This stop is adjusted so as to leave the proper thickness of material in the bottom of the mold.

It will thus be apparent that the upward movement of the table rotating piston 81 cannot take place until the rotating core has moved down to a point at which the stop S engages the top of the housing 31. The core remains in mold during the time that the piston 81 is moving upward, and it will be seen, therefore, that the time during which the core remains in the mold depends upon the rate at which the piston 81 is lifted. This is controlled by means of a needle valve positioned in the outlet in the top of the cylinder 82. Thus the apparatus may be adjusted so as to hold the core member in the mold over any predetermined period of time. It will be understood by those familiar with the art that it is sometimes important to hold the core in the mold a sufficient length of time to permit the clay to partially set, and the construction described above permits the accomplishment of this result.

The side 102 of the control valve is provided with an outlet pipe 110 which leads to the lower end 111 of the core reciprocating cylinder 38. When the hydraulic fluid delivered to the pilot valve 96 is conducted to the pipe 101 and led into the side 102 of the control valve, the hydraulic fluid is delivered into the bottom of the cylinder 38 thus moving the piston 37 and the core member 28 upwardly.

As will be hereinafter more completely pointed out, the control valve 100 is of the piston type, and is constructed so that the piston contained therein is moved to the right toward the side 99 when an increased pressure is created in the valve chamber, such pressure having been incurred by the core member having reached its upward movement to the point at which the stop collar 112 engages the lower surface of the housing 31. When this pressure is reached, the piston in the control valve chamber is moved to the right, opening a port which communicates with a secondary return and delivery outlet pipe 113. This pipe connects through a control valve unit 114 with the upper end 115 of the table racking cylinder 82. From this construction, it will be seen that the hydraulic fluid cannot be delivered into the top of the cylinder 82 until the core member has been completely removed from the mold in which it has been working.

The details in the construction of the valve mechanism, together with the details in the mechanism for controlling these valves so that the operation of the machine is entirely automatic and the movement of the various parts are dependent upon one another, will be best understood from the description of the valve structures shown in Figs. 4 and 5.

Referring to Figs. 4 and 5, the pilot valve 96 is shown as comprising a housing 120 which has a cylindrical chamber 121 and is provided with head members 122 and 123, such head members being provided with packing glands 124 and 125, through which a piston valve actuating rod 126 extends. The rod 126 is attached to a hollow piston member 127, and this member is shown as having a plurality of ports 128 formed therein, and as having its outer surface provided with an annular recess or channel 129.

The control valve 100 consists of a housing 132 which is secured at one end upon the standard 14 by means of bolts 133 and has a cylindrical chamber 134 provided therein, the opposite end of such chamber being closed by a head member 135 which is provided with a packing gland 136 through which a piston rod 137 extends. The inner end of the piston rod 137 is attached to a piston 138, such piston being shown as of a relatively long construction, and as having an elongated annular recess or channel 139 formed at its mid portion. The head member 135 is shown as being provided with an inwardly extending projection 140 which limits the movement of the piston 138 so that the outlet port 141 which communicates with the return and delivery pipe 110 is always open.

It will be noted from Fig. 4 that when the piston is positioned in engagement with the stop member 140, the port 142 which communicates with the pipe 113 is closed, but that when the piston is moved to the dot and dash line position shown, the port 142 is open for establishing communication between the return and delivery pipe 101 with the pipe 113.

In the operation of this valve mechanism, assuming the elements thereof to be in the relative position shown in Fig. 4, the pressure fluid is entering the chamber 121 in valve 96 through the inlet pipe 97, such fluid passes through the hollow piston 127 and is delivered out through the ports 128 into an annular chamber 145 into the return and delivery pipe 101 and the pipe 101 delivers the fluid into the end portion 102 of the control valve cylinder. From this point the fluid passes into the pipe 110 through the port 141. The fluid in the pipe 110 enters the bottom of the cylinder 38, forcing the piston 37 therein upwardly to a point at which the stop 112 engages the bottom portion of the housing 131. When this position has been reached, the continued operation of the pump 93 effects an increase in the pressure of the hydraulic fluid and such increased pressure is effective to force the piston 138 to the right into the dot and dash position shown, uncovering the port 142 and admitting the hydraulic fluid into the pipe 113 through which it is delivered to the top of the table rotating cylinder 82, forcing the piston 81 therein and the rack 63 downward. When the piston 81 reaches its lowermost position, it is effective through the medium of mechanism indicated generally by reference numeral 147, (Figs. 1 and 8) to throw the valve control rod 126 and the piston valve 127, which is mounted thereon, to the left into the position shown in Fig. 5.

While the parts are still in the position shown in Fig. 4, it will be understood that the fluid in the cylinder 38 above the piston 37 is forced outwardly through the outlet 104 which delivers it through port 150 into the right side of the valve chamber 134. This exhaust fluid leaves the valve chamber 134 through the return and inlet pipe 98 from which it is delivered into an annular chamber 151 formed on the interior of the pilot valve chamber. It will be noted that when the pilot valve piston is in the position shown in Fig. 4, the annular recess 129 is positioned so as to establish communication between the channel 151 and a second channel 152 which is formed in the wall of the pilot valve cylinder adjacent the channel 151. Reference numeral 153 indicates an outlet pipe which communicates with the channel 152 and through which the exhaust fluid is delivered into the tank, as indicated at 154 in Fig. 1.

The exhaust from the bottom of the cylinder 82 follows substantially the same course outlined above. This exhaust fluid passes through the check valve unit indicated at 156 into the pipe 103, which delivers it into the control valve 100 where it enters the space formed by the channel 139 (the piston 138 being in the dot and dash line position shown). The exhaust fluid leaves the valve 100 through pipe 157 which leads to the tank as indicated at 158. The check valve 156 is provided so as to prevent the possibility of pressure fluid entering the bottom of cylinder 82 during the downward movement of the piston in cylinder 38, and, as pointed out above, the adjustable check valve 105 is provided with sufficient tension to prevent any possibility of the fluid entering through this valve during the same operation. Reference numeral 156' indicates an adjustable valve which is used to govern the rate of delivering pressure fluid into the bottom of cylinder 82 and consequently comprises a means for governing the speed of travel of the piston 81 during its upward stroke.

When the piston 127 is in the position shown in Fig. 5, the pressure fluid entering the housing 96 through the inlet pipe 97 passes directly into the return and inlet pipe 98 which carries it to the right hand side of the chamber 134 in the control valve housing where it passes through the port 150 into the pipe 103 which delivers it into the upper end of cylinder 38. The fluid in the upper end of cylinder 38 forces the piston and its associated parts, including the core member 27, downwardly, so that the core 28 enters the mold positioned therebelow.

When the core 28 has been forced down to a point at which the stop S engages the housing 31, the continued operation of the pump tends to build up a pressure in the line 103 and when this pressure reaches a point sufficient to overcome the resistance of the spring control valve 105, the pressure fluid opens the valve 105 and enters the cylinder 82 below the piston 81 contained therein. The piston 81 is then raised upwardly, moving the racking pinion 61 which is now rotating freely upon the shaft 58. When the piston nears the upper end of its stroke the mechanism indicated at 147 is effective to reverse the position of the hollow piston in the pilot valve 96, moving the same to the position in Fig. 4, where the first operation described above is repeated.

It is important in the operation of this device that the pressure fluid entering the top of the cylinder 82 be controlled so that undue velocity is not imparted to the table rotating mechanism. This control is preferably adjustable and is obtained by providing an adjustable valve 160 positioned in a by-pass 161 through which the pressure fluid enters the top of the cylinder 82. The outlet fluid coming from the top of the cylinder 82 passes through the spring loaded check valve 160. During the downward movement of the piston in cylinder 82 the fluid is admitted into the top of the cylinder through the spring controlled check valve 163, and this valve, like valve 156, may be set to govern the speed of the downward movement of the piston.

Reference numeral 165 indicates a check valve which is provided in the inlet to the bottom of cylinder 82 and which cooperates with an outlet by-pass 166 to form a fluid cushion below the piston 81 during the down stroke of this piston. This construction provides what will hereinafter be referred to as a yieldable stop for the rotary movement of the table and provides a unit which operates smoothly and in which all of the moving parts are maintained in perfect synchronism.

The reversing mechanism indicated at 147 and referred to above in a general way as comprising the means for automatically reversing the position of the piston in the pilot valve 96 when the piston 81 in the racking cylinder 82 reaches the two extreme positions of its movement, is best shown in Fig. 8, and embodies a crank 168, which is pivotally mounted upon the side of the tank 90, as indicated at 169. The crank 168 has a downwardly projecting arm 170 which is attached through the medium of a link 171 to the outer end 126' of the piston rod 126. The crank 168 also has a tongue 172, the end of which is adapted to be engaged by spring controlled latch fingers 173 and 174. The finger 173 is pivotally mounted upon the side of the tank, as indicated at 175, and the finger 174 is pivotally mounted upon a supporting plate 176, as indicated at 175'. The plate 176 may be attached to the side of the tank or any other suitable supporting member. The projecting arm 172 is provided with a slot or aperture through which a control rod 178 extends. The lower end of this rod is slidably supported by a guide bracket 179 and the upper end of the rod slidably extends through an arm 180 which is attached to the rack member. The rod is provided with stops 180a and 180b which are adapted to be engaged by the arm 180 at predetermined intervals in the movement of the rack 63 for imparting movement to the rod. Reference numerals 181 and 182 indicate finger control engagement members which are mounted upon the rod 178 above and below the arm 172. Reference numerals 183 and 184 indicate compression springs which are positioned upon the rod above and below the finger 172 so as to be engaged by the engagement members 181 and 182 respectively. Reference numerals 185 and 186 indicate compression springs which are positioned behind the innermost ends of the latch fingers 173 and 174, such springs being held in position by means of bosses 187 and 188 which are mounted upon the supporting plate 176. The outer portions of the fingers 173 and 174 are provided with adjustable pins which project from the fingers toward the rod 178. These pins are situated so as to be engaged by the inner tapered surfaces of the engagement members 181 and 182, such pins being indicated by reference numeral 190.

In the operation of this mechanism, assuming the parts to be in the position shown in Fig. 1 where the piston and cylinder 82 are in position for an upward movement, it will be understood that the upward movement from the position shown raises the compression spring 184 upwardly into engagement with the arm 172 and the continued upward movement compresses this spring until the engagement member 181 reaches the pin 190 on the finger 173. The engageemnt of the member 181 with the pin on the finger 173 throws the finger back a sufficient distance to permit the compression spring 184 to impart a quick upward thrust to the arm 172, swinging the same upwardly and at the same time swinging the lower projecting crank 170 to the right and consequently imparting a similar movement to the hollow piston in the pilot valve 96. It will be noted that the ends of the fingers 173 and 174 are rounded so that the swinging arm 172 may clear them during its movement. After the last mentioned movement described above, the arm 172 will be positioned above the shoulder on the lower end of the finger 174 and the downward movement of the piston in the cylinder 82 will be effective to release the same and reverse the position of the valve in a manner similar to that just described.

It is believed from the foregoing description of the control valve 100 and its operation, that the relationship between the control valve and the table locking device will be readily apparent. It is emphasized that no fluid can enter the upper end of the cylinder 82 for racking the table until the piston 138 in the control valve cylinder 100 has been moved to the right into the dot and dash line position indicated in Fig. 4, and since this movement of the piston is necessary to unlock the table, it is obvious that a rotating movement cannot be imparted to the table until it is unlocked. The release of the pressure upon the left side of the piston 138 is attended by an application of pressure to the right side of the piston which forces the bar 72 back into position and locks the table, at the same time releasing the ratchet clutch. It is also apparent that the opposite movement of the piston is effective to throw the table racking clutch into engagement, and since the locking of the table is dependent upon the same operation which disengages the clutch, it is impossible to rotate the table racking pinion 57 when the locking bar 72 is situated in one of the notches in the table.

Reference numeral 195 indicates a safety by-pass which comprises an outlet 196 situated in the inlet 97 to pilot valve 96 and is provided with an adjustable by-pass valve 197 through which fluid may be delivered into a tank inlet 198. This by-pass is provided so that the accumulation of pressure due to the sticking of a valve or the check of fluid flow by accumulated foreign material or in any other manner, may be released through the adjustable valve 197. As pointed out above, the pump 93 is continuously operated, and for the purpose of preventing intermittent increase in pressure in the pipes below the pilot valve 96, during the shifting movement of valve 96, we provide the valve 96 with an auxiliary outlet by-pass 200 which is situated so as to receive fluid through the ports 128 in the hollow piston 127 during its reciprocation.

Reference numeral 201 indicates a manually controlled by-pass valve which is interposed in the pump outlet line 95 and is adapted for use in optionally directing a pumped fluid through a tank return pipe 202 instead of delivering the same into the pilot valve inlet pipe 97. This valve 201 is provided with control means indicated generally by reference numeral 203 and embodies a handle 204 which is pivotally mounted upon the base of the frame, as indicated at 205. The handle 204 is, therefore, the means for manually controlling the operation of the machine.

Reference numeral 206 indicates a counterweight which is connected, through the medium of a cable 207 running over a pulley 208 mounted in the upper end of the frame, to the core member as indicated at 209. This counterweight acts as a balance for the core member and increases the operating efficiency of the unit. It also forms the means for controlling the operation of the extractor. This is accomplished by attaching an extractor control bar 210 to the counterweight, such bar extending downwardly to a point at which its lower end 211 is pivotally attached to an extractor operating arm 212. The arm 212 is pivotally attached to the base of the frame, as indicated at 213, and has its outer end provided with a shoe 214 which is adapted to engage the downwardly projecting ends of the extractor actuating rods 24. The shoe 214 is positioned so as to be situated below one of the molds when another of the molds is positioned below the core member 27.

From this construction it will be seen that as the core member 27 is raised, the counterweight 206 lowers, moving the shoe 214 down into the position shown in Fig. 1. When the core member is advanced downwardly into a mold, the counterweight raises from the position shown in Fig. 1, at the same time lifting the shoe 214 so that it is brought into engagement with the lower end of the actuating member 24, thus lifting the plate 23 and the formed article from the mold to a position at which it can be removed.

To assist in preventing the rotary table 20 running ahead of the table racking organization, we provide a table braking mechanism, indicated generally by reference numeral 216. This mechanism consists merely of a shoe 217 which is held in pressure engagement with the upper surface of the rotary table by means of a screw 218 which extends through a suitably positioned base or projection 219 mounted upon the vertical member 13 of the frame.

The operation of the device contemplated by this invention requires the services of but one operator who places a properly proportioned or weighed ball of clay in the mold immediately preceding the core member, and removes the formed articles from the mold following the core member after the extractor has lifted them into a position at which they are accessible.

The steps followed in the actual operation of the machine are believed to have been clearly set forth in the foregoing description, from which it will be apparent that the operation of all the parts are correlated so that they must follow one another in their proper order. It is, therefore, impossible for the core member, the table, or the table lock to become jammed or stuck due to an improper timing in the operation of these parts, and the bursting of a pipe or the rupture of a valve due to increased pressure which may be inadvertently brought about by the accumulation of foreign material in the pressure fluid or the sticking of a valve, is prevented by the safety by-pass valve 197. The unit is compact in structure, its operation does not require the services of a skilled operator, and the molded articles may be formed with great speed at a low labor cost.

It is to be understood that while we have herein described and illustrated one preferred form of our invention, the invention is not limited to the precise construction described above, but includes within its scope whatever changes fairly come within the spirit of the appended claims.

We claim as our invention:

1. An automatic molding machine embodying: a rotary table; a plurality of molds in said table; a core member mounted above said table for intermittent movement into said molds; hydraulic means for reciprocating said core member; and hydraulic means for intermittently rotating said table.

2. An automatic molding machine embodying: a rotary table; a plurality of molds in said table; a core member mounted above said table for intermittent movement into said molds; hydraulic means for reciprocating said core member; and hydraulic means controlled by said core reciprocating means for intermittently rotating said table.

3. An automatic molding machine embodying: a rotary table; a plurality of molds in said table; extracting means in said molds; a core member mounted above said table for intermittent movement into said molds; hydraulic means for reciprocating said core member; hydraulic means controlled by said core reciprocating means for intermittently rotating said table; and means for automatically operating said extracting means in one of said molds while said core member is in another of said molds.

4. An automatic molding machine embodying: a rotary table; a plurality of molds in said table; a core member mounted above said table for intermittent movement into said molds; hydraulic means for reciprocating said core member; hydraulic means for intermittently rotating said table; and means for intermittently locking said table against rotation.

5. An automatic molding machine embodying: a rotary table; a plurality of molds in said table; a core member mounted above said table for intermittent movement into said molds; hydraulic means for reciprocating said core member; hydraulic means for intermittently rotating said table; and means operated by said hydraulic table-rotating means for intermittently locking said table.

6. An automatic molding machine embodying: a rotary table; a plurality of molds in said table; a core member mounted above said table for intermittent movement into said molds; a hydraulically operated piston for reciprocating said core member; a hydraulically operated piston for intermittently rotating said table; and means operable by the hydraulic pressure on said first mentioned piston for controlling the operation of said last mentioned piston.

7. An automatic molding machine embodying: a rotary table; a plurality of molds in said table; a core member mounted above said table for intermittent movement into said molds; a hydraulically operated piston for reciprocating said core member; a hydraulically operated piston for intermittently rotating said table; and means comprising a piston valve operable by the hydraulic pressure on said first mentioned piston for controlling the operation of said last mentioned piston in one direction.

8. An automatic molding machine embodying: a rotary table; a plurality of molds in said table; a core member mounted above said table for intermittent movement into said molds; a hydraulically operated piston for reciprocating said core member; a hydraulically operated piston for intermittently rotating said table; and means comprising an adjustable check valve operable by the hydraulic pressure on said first mentioned piston for controlling the operation of said last mentioned piston in one direction.

9. An automatic molding machine embodying: a rotary table; a plurality of molds in said table; a core member mounted above said table for intermittent movement into said molds; a hydraulically operated piston for reciprocating said core member; a hydraulically operated piston for intermittently rotating said table; and means comprising an adjustable check valve and piston valve operable by the hydraulic pressure on opposite sides of said core reciprocating piston for controlling the application of hydraulic pressure to opposite sides of said table rotating piston.

10. An automatic molding machine embodying: a rotary table; a plurality of molds in said table; a core member mounted above said table for intermittent movement into said molds; a hydraulic cylinder; a core reciprocating piston in said cylinder; means connecting said piston with said core member; a second hydraulic cylinder; a table rotating piston in said second cylinder; means associated with said table rotating piston for rotating said table during the movement of said pistons in one direction; a pilot valve for controlling the delivery of pressure fluid to opposite sides of said core operating piston; and secondary valve means for governing the flow of said hydraulic fluid to opposite sides of said table rotating piston.

11. An automatic molding machine embodying: a rotary table; a plurality of molds in said table; a core member mounted above said table for intermittent movement into said molds; a hydraulic cylinder; a core reciprocating piston in said cylinder; means connecting said piston with said core member; a second hydraulic cylinder; a table rotating piston in said second cylinder; means associated with said table rotating piston for rotating said table during the movement of said pistons in one direction; a pilot valve for controlling the delivery of pressure fluid to opposite sides of said core operating piston; and secondary valve means dependent upon the hydraulic pressure in said first mentioned cylinder for governing the flow of said hydraulic fluid to opposite sides of said table rotating piston.

12. An automatic molding machine embodying: a rotary table; a plurality of molds in said table; a core member mounted above said table for intermittent movement into said molds; means for reciprocating said core member; means for intermittently rotating said table; and friction means for retarding the rotative movement of said table.

13. An automatic molding machine embodying: a rotary table; a plurality of molds in said table; a core member mounted above said table for intermittent movement into said molds; a hydraulic cylinder; a core reciprocating piston in said cylinder; means connecting said piston with said core member; a second hydraulic cylinder; a table rotating piston in said second cylinder; means associated with said table rotating piston for rotating said table during the movement of said pistons in one direction; a pilot valve for controlling the delivery of pressure fluid to opposite sides of said core operating piston; secondary valve means for governing the flow of said hydraulic fluid to opposite sides of said table rotating piston; and means operable by said table rotating piston for controlling the action of said pilot valve.

14. An automatic molding machine embodying: a rotary table; a plurality of molds in said table; a core member mounted above said table for intermittent movement into said molds; a hydraulic cylinder; a core reciprocating piston in said cylinder; means connecting said piston with said core member; a second hydraulic cylinder; a table rotating piston in said second cylinder; means including a clutch member associated with said table rotating piston for rotating said table during the movement of said pistons in one direction; a pilot valve for controlling the delivery of pressure fluid to opposite sides of said core operating piston; and secondary valve means for governing the flow of said hydraulic fluid to opposite sides of said table rotating piston.

15. An automatic molding machine embodying: a rotary table; a plurality of molds in said table; a core member mounted above said table for intermittent movement into said molds; a hydraulic cylinder; a core reciprocating piston in said cylinder; means connecting said piston with said core member; a second hydraulic cylinder; a table rotating piston in said second cylinder; means including a rack and pinion and a clutch member associated with said table rotating piston for rotating said table during the movement of said pistons in one direction; a pilot valve for controlling the delivery of pressure fluid to opposite sides of said core operating piston; and secondary valve means for governing the flow of said hydraulic fluid to opposite sides of said table rotating piston.

16. An automatic molding machine embodying: a rotary table; a plurality of molds in said table; a core member mounted above said table for intermittent movement into said molds; a hydraulic cylinder; a core reciprocating piston in said cylinder; means connecting said piston with said core member; a second hydraulic cylinder; a table rotating piston in said second cylinder; means associated with said table rotating piston for rotating said table during the movement of said pistons in one direction; a pilot valve for controlling the delivery of pressure fluid to opposite sides of said core operating piston; secondary valve means for governing the flow of said hydraulic fluid to opposite sides of said table rotating piston; and means including a latch member operable by said table rotating piston for controlling the action of said pilot valve.

17. An automatic molding machine embodying: a frame; a rotary table mounted in said frame; a plurality of molds in said table; a core member in said frame above said table for intermittent movement into said molds; a cylinder mounted in said frame; a core operating piston in said cylinder; means connecting said piston with said core member; a secondary cylinder mounted in said frame; a table rotating piston in said secondary cylinder; means associated with said table rotating piston for rotating said table during the movement of said piston in one direction; a source of pressure fluid; a pilot valve for governing the delivery of said pressure fluid from said source to opposite sides of said core operating piston; and a secondary valve connected with said pilot valve for governing the delivery of pressure fluid to opposite sides of said table rotating piston.

18. An automatic molding machine embodying: a frame; a rotary table mounted in said frame; a plurality of molds in said table; a core member mounted in said frame above said table for intermittent movement into said molds; a cylinder mounted in said frame; a core operating piston in said cylinder; means connecting said piston with said core member; a secondary cylinder mounted in said frame; a table rotating piston in said secondary cylinder; means associated with said table rotating piston for rotating said table during the movement of said piston in one direction; a source of pressure fluid; a pilot valve for governing the delivery of said pressure fluid from said source to opposite sides of said core operating piston; and a secondary valve operated by said pressure fluid connected with said pilot valve for governing the delivery of pressure fluid to opposite sides of said table rotating piston.

19. An automatic molding machine embodying: a frame; a rotary table mounted in said frame; a plurality of molds in said table; a core member mounted in said frame above said table for intermittent movement into said molds; a cylinder mounted in said frame; a core operating piston in said cylinder; means connecting said piston with said core member; a secondary cylinder mounted in said frame; a table rotating piston in said secondary cylinder; means associated with said table rotating piston for rotating said table during the movement of said piston in one direction; a source of pressure fluid; a pilot valve for governing the delivery of said pressure fluid from said source to opposite sides of said core operating piston; a secondary valve connected with said pilot valve for governing the delivery of pressure fluid to opposite sides of said table rotating piston; and means associated with said table racking piston for actuating said pilot valve.

20. An automatic molding machine embodying: a frame; a rotary table mounted in said frame; a plurality of molds in said table; a core member mounted in said frame above said table for intermittent movement into said molds; a cylinder mounted in said frame; a core operating piston in said cylinder; means connecting said piston with said core member; a secondary cylinder mounted in said frame; a table rotating piston in said secondary cylinder; means associated with said table rotating piston for rotating said table during the movement of said piston in one direction; a source of pressure fluid; a pilot valve for governing the delivery of said pressure fluid from said source to opposite sides of said core operating piston; a secondary valve connected with said pilot valve for governing the delivery of pressure fluid to opposite sides of said table rotating piston, said pilot valve comprising a housing provided with a plurality of parts, an apertured piston in said housing, and a piston rod for controlling said piston; and means for actuating said pilot valve comprising a crank connected with said piston rod and a means associated with said table racking piston for operating said crank.

21. An automatic molding machine embodying: a frame; a rotary table mounted in said frame; a plurality of molds in said table; a core member mounted in said frame above said table for intermittent movement into said molds; a cylinder mounted in said frame; a core operating piston in said cylinder; means connecting said piston with said core member; a secondary cylinder mounted in said frame; a table rotating piston in said secondary cylinder; means associated with said table rotating piston for rotating said table during the movement of said piston in one direction; a source of pressure fluid; a pilot valve for governing the delivery of said pressure fluid from said source to opposite sides of said core operating piston; a secondary valve connected with said pilot valve for governing the delivery of pressure fluid to opposite sides of said table rotating piston, said pilot valve including a piston and a piston rod for moving same; means for actuating said pilot valve comprising a crank connected with said piston rod; latch means associated with said crank for holding said piston in opposite positions; and means actuated by said table rotating piston for releasing said latch and moving said pilot piston valve into opposite positions.

22. An automatic molding machine embodying: a frame; a rotary table mounted in said frame; a plurality of molds in said table; a core member mounted in said frame above said table for intermittent movement into said molds; a cylinder mounted in said frame; a core operating piston in said cylinder; means connecting said piston with said core member; a secondary cylinder mounted in said frame; a table rotating piston in said secondary cylinder; means associated with said table rotating piston for rotating said table during the movement of said piston in one direction; a source of pressure fluid; a pilot valve for governing the delivery of said pressure fluid from said source to opposite sides of said core operating piston; a secondary valve connected with said pilot valve for governing the delivery of pressure fluid to opposite sides of said table rotating piston, said pilot valve including a piston and a piston rod for moving same; means for actuating said pilot valve comprising a crank connected with said piston rod; latch means associated with said crank for holding said piston in opposite positions; and means including compression springs actuated by said table rotating piston for releasing said latch and moving said pilot piston valve into opposite positions.

23. An automatic molding machine embodying: rotatable mold supporting means; molds in said mold supporting means; a reciprocating core member adapted for intermittent movement into said molds; hydraulic means for reciprocating said core member; hydraulic means for rotating said mold supporting means; and means dependent upon the hydraulic pressure in a core reciprocating means for governing the operation of said table rotating means.

24. An automatic molding machine embodying: rotatable mold supporting means; molds in said mold supporting means; a reciprocating core member adapted for intermittent movement into said molds; a brake for intermittently holding said table against rotation; means for rotating said mold supporting means; hydraulic means for reciprocating said core member; hydraulic means for actuating said brake and said rotating means; and valve means dependent upon the hydraulic pressure in said first hydraulic means for controlling the delivery of pressure fluid to said last mentioned hydraulic means.

25. An automatic molding machine embodying: a frame; a rotary table in said frame; a plurality of molds in said table; a core member mounted in said frame for intermittent movement into said molds; hydraulic means for intermittently reciprocating said core; hydraulic means for intermittently rotating said table; and means for locking said table during reciprocation of said core.

26. An automatic molding machine embodying: a frame; a rotary table in said frame; a plurality of molds in said table; a core member mounted in said frame for intermittent movement into said molds; hydraulic means for intermittently reciprocating said core; hydraulic means for intermittently rotating said table; and automatic means for holding said table against movement until the core member has reached the top of its travel.

27. An automatic molding machine embodying: a frame; a rotary table in said frame; a plurality of molds in said table; a core member mounted in said frame for intermittent movement into said molds; hydraulic means for intermittently reciprocating said core; hydraulic means for intermittently rotating said table; means for locking said table during reciprocation of said core; and automatic means for preventing downward movement of said core until said table is in a locked position.

28. An automatic molding machine embodying: a frame; a rotary table in said frame; a plurality of molds in said table; a core member mounted in said frame for intermittent movement into said molds; hydraulic means for intermittently reciprocating said core; hydraulic means for intermittently revolving said table; and hydraulic means for yieldably stopping the rotary movement of said table.

29. An automatic molding machine embodying: a frame; a rotary table in said frame; a plurality of molds in said table; a core member mounted in said frame for intermittent movement into said molds; hydraulic means for intermittently reciprocating said core; hydraulic means for intermittently revolving said table; and means for governing the rotary speed of said table.

30. An automatic molding machine embodying: a frame; a rotary table in said frame; a plurality of molds in said table; a core member mounted in said frame for intermittent movement into said molds; hydraulic means for intermittently reciprocating said core; hydraulic means for intermittently revolving said table; and means for governing the period during which the core member remains at the bottom of its travel.

31. An automatic molding machine embodying: a frame; a rotary table in said frame; a plurality of molds in said table; a core member mounted in said frame for intermittent movement into said molds; hydraulic means for intermittently reciprocating said core; hydraulic means for intermittently revolving said table; means for governing the rotary speed of said table; and means for governing the period during which the core member remains at the bottom of its travel.

32. An automatic molding machine embodying: a frame; a rotary table in said frame; a plurality of molds in said table; a core member mounted in said frame for intermittent movement into said molds; hydraulic means for intermittently reciprocating said core; hydraulic means for intermittently revolving said table; and a manual control for stopping the movement of said core member at any predetermined point in the cycle of operation of said machine.

33. An automatic molding machine embodying: a frame; a rotary table in said frame; a plurality of molds in said table; a core member mounted in said frame for intermittent movement into said molds; hydraulic means for intermittently reciprocating said core; hydraulic means for intermittently revolving said table; and means for governing the length of travel of said reciprocating core.

In testimony whereof, we have hereunto set our hands at Los Angeles, California, this 20th day of November, 1930.

FRANK Y. PEARNE.
WILLIAM McCLINTOCK.